United States Patent
Takezaki et al.

(10) Patent No.: US 9,429,193 B2
(45) Date of Patent: Aug. 30, 2016

(54) METHOD FOR PRODUCING FLUID DYNAMIC PRESSURE BEARING

(75) Inventors: Yoji Takezaki, Saitama (JP); Shigeyuki Tanabe, Saitama (JP); Shinobu Aso, Saitama (JP)

(73) Assignee: PORITE CORPORATION, Saitama-Ken (JP)

(\*) Notice: Subject to any disclaimer, the term of this patent is extended or adjusted under 35 U.S.C. 154(b) by 1285 days.

(21) Appl. No.: 12/980,557

(22) Filed: Dec. 29, 2010

(65) Prior Publication Data

US 2012/0027635 A1 Feb. 2, 2012

(30) Foreign Application Priority Data

Aug. 2, 2010 (JP) ................. 2010-173511

(51) Int. Cl.
*F16C 33/12* (2006.01)
*F16C 33/14* (2006.01)

(52) U.S. Cl.
CPC .......... *F16C 33/124* (2013.01); *F16C 33/128* (2013.01); *F16C 33/145* (2013.01); *F16C 2202/10* (2013.01)

(58) Field of Classification Search
CPC .......................... F16C 33/124; F16C 33/145
USPC ........................... 360/55; 428/642
See application file for complete search history.

(56) References Cited

U.S. PATENT DOCUMENTS

2007/0092171 A1\* 4/2007 Asada et al. ............ 384/107
2009/0073596 A1\* 3/2009 Asada et al. ............ 360/55

FOREIGN PATENT DOCUMENTS

JP 07310101 A \* 11/1995

\* cited by examiner

*Primary Examiner* — Weiping Zhu
(74) *Attorney, Agent, or Firm* — Wenderoth, Lind & Ponack, L.L.P.

(57) ABSTRACT

A method includes compacting metal powder including at least not less than 70% by weight of particles with diameters of not more than 45 μm to obtain a bearing material, sintering the bearing material, forming grooves for generating dynamic pressure on the sintered bearing material, and performing steam treatment to the sintered bearing material with the grooves to form a ferrosoferric oxide ($Fe_3O_4$) membrane on a porous surface of an inner surface or on porous surfaces of an inner surface and both end surfaces. Thus, gaps between particles become small because diameters of the particles of material powder of a powder sintered bearing material are approximately even and fine and are even small pores. As a result, sealing pores on the surface due to steam treatment is easy, and dynamic pressure cannot be leaked.

17 Claims, 6 Drawing Sheets

White Part: Metal Part

Black Part: Pore Part

50 μm

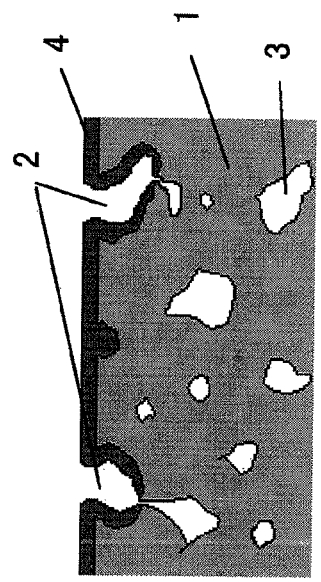
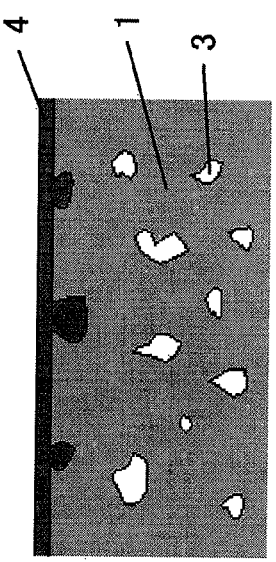

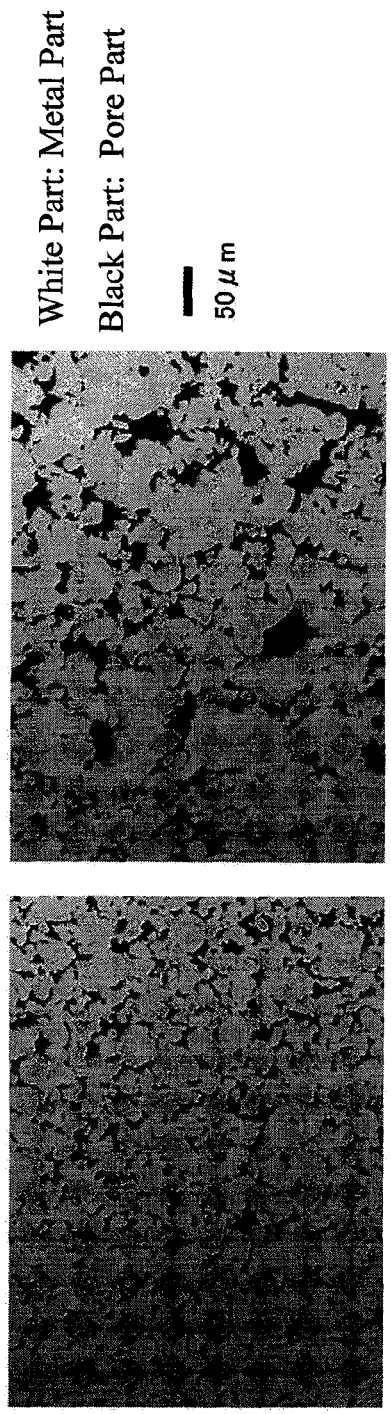

METHOD FOR PRODUCING FLUID DYNAMIC PRESSURE BEARING

BACKGROUND OF THE INVENTION

The present invention relates to a method for producing a fluid dynamic pressure bearing supporting a rotation shaft without contact, and it is intended to increase a sealing effect sufficiently by forming a ferrosoferric oxide ($Fe_3O_4$) membrane especially on an inner peripheral surface and edge surfaces of a fluid dynamic pressure bearing made of sintered metal on which dynamic pressure generating grooves on an inner peripheral surface thereof are formed. These features increase a dimension accuracy and improve a dynamic pressure effect, increase strength of the sintered metal, and thus, increase durability and rotation accuracy of a motor and to achieve low noise.

In recent years, with high accuracy of AV equipment, OA equipment or the like, requests of rotation accuracy of motors such as especially a spindle motor for hard disc drives and optical disc drives as represented by DVD and CD, furthermore blue ray disc or the like, color wheel motors using projectors, LBP polygon mirror scanner motors, fan motors or the like, and of achieving low noise are being heightened remarkably, so that a fluid dynamic pressure type bearing supporting a motor shaft without contact are noticed in order to correspond these requests.

A fluid dynamic pressure type bearing can support a rotation shaft of a motor without contact by generating dynamic pressure by forming grooves on an inner peripheral surface and end surfaces of the bearing and filling lubricating oil in the grooves. As methods for producing these fluid dynamic pressure type bearings, in many cases, a blank (material) mainly of smelted material such as brass, stainless steel or the like is cut into a bearing shape, and then grooves are formed on an inner peripheral surface thereof by cutting or rolling.

As a blank (material) of a fluid dynamic pressure type bearing, in the case that brass is selected, though cutting performance is excellent, not only is there inferior durability by momentary contact with a motor shaft due to starting or stopping of a motor, an external load, vibration or the like, but also it is difficult to maintain available clearance due to variation of environmental temperature because of difference of expansion coefficient to a motor shaft made of stainless steel. Therefore, a use environmental temperature range of a motor is very narrow. In the case that stainless steel is selected as a blank (material) of the bearing, durability due to contact with a motor shaft is excellent and maintaining available clearance is possible because the difference of expansion coefficient is small, but there is a little problem in a cutting work.

In any blanks, in the case that a blank is cut into a bearing shape, remarkably high accuracy processing by an NC turning machine, machining or the like is necessary, because there is a little problem in mass production and in reducing the cost of production, a fluid dynamic pressure bearing possible to process a bearing in a near-net-shape and possible to produce in bulk and reduce the cost came to be considered.

In particular, in the case that sintered metal made in a powder metallurgical process is used as a blank, because a degree of freedom for selecting metal materials is high, not only iron system material that difference of expansion coefficient with a motor shaft made of stainless steel is small can be selected, but also the near-net-shape process is performed, so that process in which a blank being a difficult cutting material is cut into a bearing shape can be omitted, as a result it is possible to contribute to mass-production and decreasing the cost.

However, on the other hand, because the power sintered metal blank is a porous solid made of powder metal, in the case that this is used as a fluid dynamic pressure bearing, there are fatal problems such that dynamic pressure worked on an inner peripheral surface of the bearing is leaked and an oil surface necessary to generate stable dynamic pressure falls down because the oil filled with regular amount into a gap between the motor shaft and the inner peripheral surface of the bearing penetrates into the porous solid.

In fact, in a usual process, it is impossible to eliminate existence of communication pores due to air gaps between metal particles constituting powderintered metal material perfectly, stiffness of the bearing is decreased by that dynamic pressure generated on an inner periphery surface of the bearing leaks through the communication pores, so that there are large problems such that rotation accuracy and further a life-span of a motor is affected negatively, and further that control of oil quantity is very difficult.

Therefore, a dynamic pressure bearing such that air gaps are sealed by impregnating a powderintered metal material with resin has already been proposed (JP 8-221897 A). In the case of pure iron, air gaps are sealed by impregnating a powderintered metal material with resin and then a coat is formed thereon in order to compensate for lack of surface stiffness. Furthermore, after air gaps are sealed by impregnating a powderintered metal material with substance such as resin, metal or glass, it is considered that opening area of air gaps are contracted by giving a shot blast using metal particles or resin particles on a surface of a bearing.

Besides, a fluid dynamic pressure bearing such that surface roughness, corrosion resistance and abrasion resistance are attempted to be improved according to sealing pores on a surface by giving steam treatment to the powderintered metal material has been proposed (JP 2007-57068 A).

However, after cutting a blank (material) mainly of smelted material such as brass or stainless steel into a bearing shape, in the case of processing grooves on an inner peripheral surface by cutting or rolling, since it is necessary to be performed with an extremely high degree of accuracy by a NC lathe, it cannot be avoided to become high-cost. In the case of impregnating the powderintered metal material with resin, it tends to stay a resin impregnation material on a surface of a bearing material in a usual process.

There remain further problems such that dimension accuracy tends to have a bad influence and it is difficult to apply a coat on the resin surface when the resin impregnation material stays on the surface of the bearing material, that coating treatment as a post-processing tends to be imperfect when pores before impregnating resin is large, and further that metal erosion by staying coating liquid tends to take place because it is difficult to remove coating liquid in the pores perfectly though coating treatment takes place on a surface of a bearing material in order to supply a want of a surface strength in pure iron.

Besides, in the case that resin impregnation treatment takes place, though a cleaning work has to be taken place in every bearing material, because bruises occur due to collision between the bearing materials themselves when the bearing materials are cleaned in bulk, every bearing material has to be cleaned individually to avoid the bruises, so that the cost increases remarkably. Further, expansion or retraction occurs by reacting the impregnated resin with fluid such as lubricant oil used in a fluid dynamic pressure bearing unit, and as a result it is possible to cause concern on quality and accuracy.

Furthermore, in the case that a shot blast processing takes place on a surface of a bearing after sealing pores by impregnating resin or the other substance into a powderintered metal material, roughness of a surface of a bearing generally gets worse, there are problems such that not only is it unsuitable as a fluid dynamic pressure bearing, but also costs increased because a quality of products is quite variable due to worse dimensional accuracy, and a cleaning process for removing shot powdertaying on the bearing material is necessary separately.

Moreover, in the case of a fluid dynamic pressure bearing that surface roughness, corrosion resistance and abrasion resistance are improved by sealing pores on a surface of bearing due to giving steam treatment to a powderintered metal material, since diameters of pores on a surface and an interior portion of the powderintered metal material have a large variation generally and there is remarkably variation in a sealing pore effect, it is difficult to maintain a stable dynamic pressure and it is necessarily the case that a sufficient function can bring out as a dynamic bearing.

SUMMARY OF THE INVENTION

Therefore, the present invention is provided to solve a problem of a fluid dynamic pressure bearing obtained by applying steam treatment to a powderintered metal material which is insufficient in the prior art, to increase an effect of sealing pores by forming ferrosoferric oxide ($Fe_3O_4$) membrane on an inner peripheral surface and end surfaces thereof, and further to be able to produce the fluid dynamic pressure bearing suitable to forming dynamic pressure grooves.

Concretely, the present invention relates to a method for producing a fluid dynamic pressure bearing made of powderintered metal having dynamic pressure generating grooves formed on an inner peripheral surface of the bearing. Dynamic pressure grooves are formed on a powderintered metal material that is formed by pressing, shaping and sintering metal powder including at least not less than 70% (by weight) of particles with diameters of not more than 45 μm. Then, a ferrosoferric oxide ($Fe_3O_4$) membrane is formed on a porous surface thereof by undergoing the steam treatment.

The present invention is, as described above, a method for producing a fluid dynamic pressure bearing made of powderintered metal in which dynamic pressure generating grooves are formed on an inner peripheral surface thereof. Dynamic pressure grooves are formed on a powderintered metal material that is formed by pressing, shaping and sintering metal powder including at least not less than 70% (by weight) of particles with diameters of not more than 45 μm. Then, a ferrosoferric oxide ($Fe_3O_4$) membrane is formed on a porous surface thereof by undergoing the steam treatment, as compared with the case in which steam treatment is merely undergone on the powderintered metal material, not only sealing pores can be carried out perfectly, but also surface texture of the bearing can be improved extremely well, and further corrosion resistance and abrasion resistance can be designed to be increased.

In this case, as particle's diameter of raw powder constituting the powderintered metal material is small approximately evenly, gaps between particles become small and is small porous evenly. As a result, it becomes easy to seal pores on the surface by the steam treatment, stable control of oil quantity becomes possible since oil is not impregnated into porous material in addition to leakage of the dynamic pressure functioned on the inner peripheral surface of the bearing can be prevented.

Besides, though an iron-based material is sintered within a range from 700° C. to 1300° C., in the case of a powder compacting forming using metal powder including at least not less than 70% (by weight) of particles with diameters of not more than 45 μm, because particle's diameters of the metal powder are small in the mean, sintering performance is increased, so that high sintered strength as a fluid dynamic pressure bearing material can be obtained.

BRIEF DESCRIPTION OF DRAWINGS

FIGS. 1A & 1B show partial enlarged views each of which shows an aspect of an inner peripheral surface of a bearing after steam treatment, wherein FIG. 1A shows the present invention and FIG. 1B shows the prior art;

FIGS. 2A & 2B show partial enlarged view each of which shows metal sectional view of a bearing material after sintering before stream treatment, FIG. 2A shows the present invention and FIG. 2B shows the prior art;

DETAIL DESCRIPTION OF THE INVENTION

Hereinafter, describing a concrete content of the present invention, the present invention is a method for producing a fluid dynamic pressure bearing made of powderintered metal that dynamic pressure generating grooves are formed on an inner peripheral surface of a bearing.

Metal powder used here is preferably pure iron powder containing not less than 98% (by weight) of iron component or stainless steel powder in order to create a different heat expansion coefficient for a rotation shaft of a motor small, but not limited to them if it is a material whose main component is iron and which forms a ferrosoferric oxide ($Fe_3O_4$) membrane by steam treatment, and further that a sealing pore effect can be desired.

Besides, metal powder has to contain not less than 70% (by weight), preferably not less than 80% (by weight) of particles with diameters of not more than 45 μm. In this case, when the particles with diameters of not more than 45 μm is less than 70% (by weight), since pore diameters of sintered material become too large, even if the steam treatment is carried out, it is not enough or cannot be achieved to seal pores on a surface of a bearing.

In this case, for detailed particle size of the metal powder, if cumulative 50% diameters (D50) measured by a laser beam diffraction system particle size analyzer is below 20 μm, not only is it difficult to fill up powder into a mold at a powder compacting forming, but also handling to a sintering process becomes worse by decreasing of pressed powder material strength. Thus, there is a possibility that cracks and chips are created on the bearing material.

To the contrary, when the cumulative 50% diameters (D50) measured by the laser beam diffraction system particle size analyzer exceed 60 μm, pore diameters of the sintered material become too large, and therefore sealing pores on the surface by the steam treatment cannot be achieved. Accordingly, the cumulative 50% diameters (D50) measured by the laser beam diffraction system particle size analyzer must be within a range from 20 μm to 60 μm.

Figure 3:
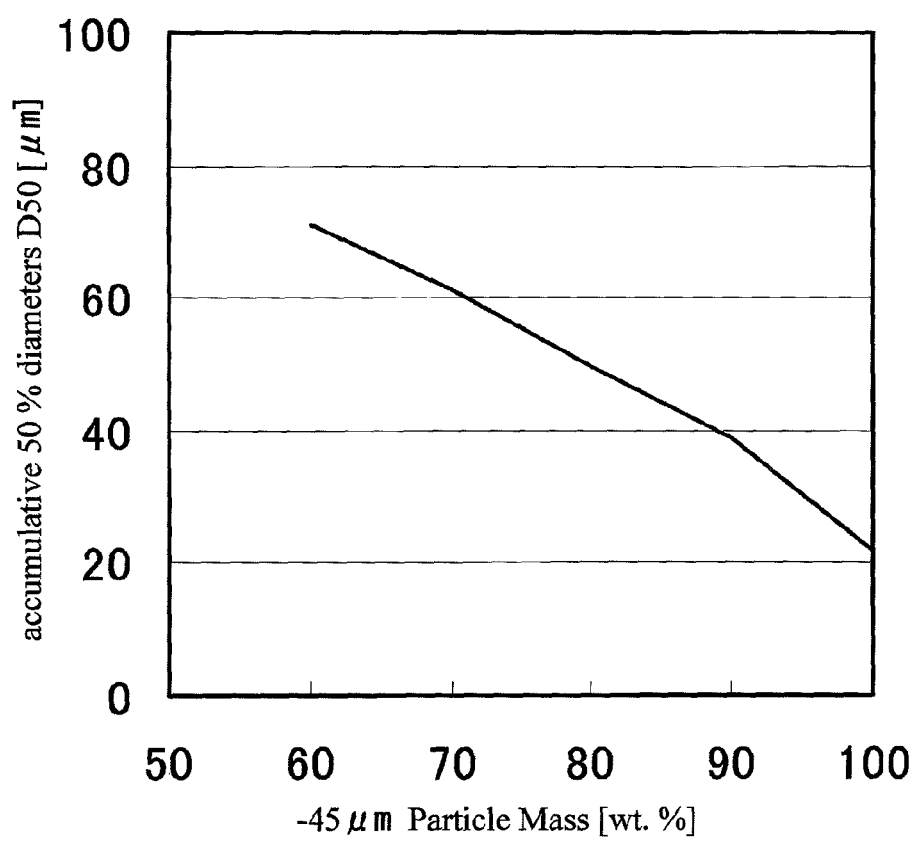
FIG. 3 is a graph showing relationship between particle mass with not more than 45 μm diameters in metal powder and an accumulative 50% diameter (D50) measured by a laser beam diffraction system grain size distribution diameter.

For the relationship between the above-mentioned not more than 45 μm of particle mass and the cumulative 50% diameters (D50) measured by the laser beam diffraction system particle size analyzer, as shown in FIG. 3, it can be seen that "the particles with not more than 45 μm of diameters are not less than 70% (by weight)" and "the cumulative 50% diameters (D50) measured by the laser beam diffraction system particle size analyzer is within a range from 20 μm to 60 μm" correspond to each other.

Figure 4:
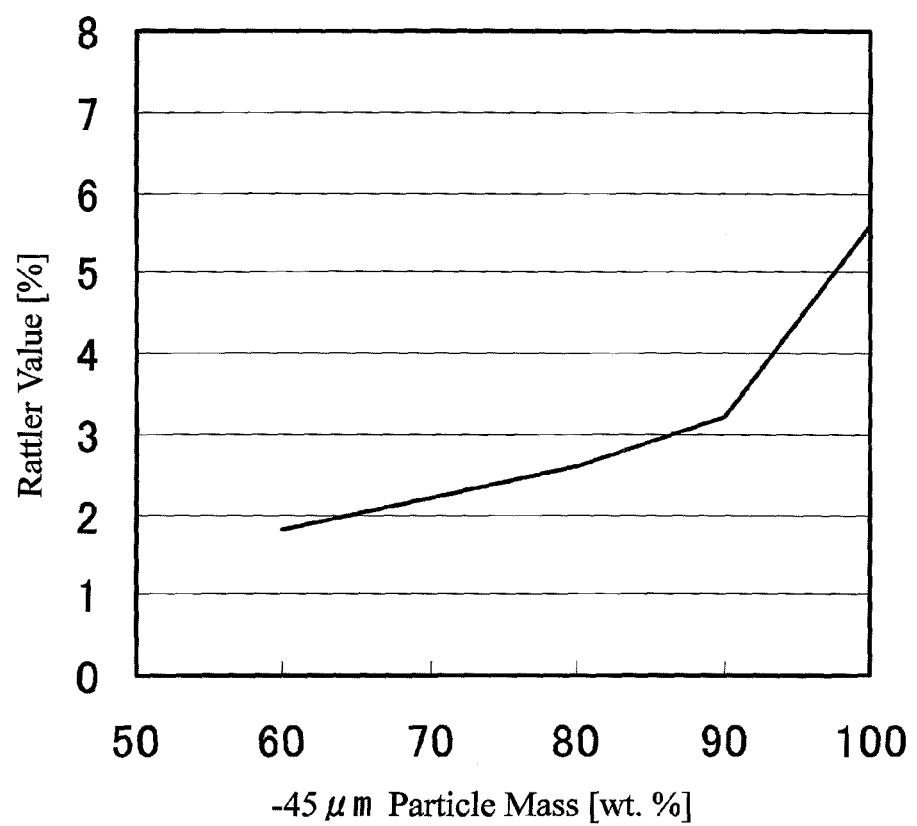
FIG. 4 is a graph showing relationship between particle mass with not more than 45 μm diameters in metal powder and Rattler value of a powder compacting shaped material.

In this case, the relationship between the particle mass with not more than 45 μm of diameters in metal powder and Rattler value of powder compact is shown in FIG. 4. As can be understood from FIG. 4, the tendency that particle diameters are smaller as Rattler value becomes higher and further strength of powder compact is decreased is shown. Thus, when particles with not more than 45 μm of diameters is 100% (by weight) (namely when cumulative 50% diameters (D50) is 20 μm), the strength of a powder compact for stable production, becomes very minimal. When the cumulative 50% diameters (D50) falls below 20 μm in this case, there is a possibility that cracks and chips are formed.

After the above-mentioned metal powder is mixed with powdered lubricant as typified by a zinc stearate or a fatty acid amide system wax, the resulting mixture is shaped in powder compacting form, and then it is sintered. Metal powder that includes at least not less than 70% (by weight) of particles with not more than 45 μm of diameters, preferably at least not less than 80% (by weight) of them and that cumulative 50% diameters (D50) measured by the laser beam diffraction system particle size analyzer are within a range from 20 μm to 60 μm is pelletized, and it is preferred that powder compacting forming is carried out after arranging particle sizes and increasing powder flowability.

The powder compact produced as described above is sintered within a range from 700° C. to 1300° C. for ten to sixty minutes under an atmosphere such as a vacuum atmosphere and a reduction atmosphere, an inert atmosphere or the like by a mesh-belt sintering furnace or a batch sintering furnace. It is preferred that a sintering furnace, sintering temperature, an atmosphere, and a sintering time are selected availably corresponding to a used metal material so as to control an influence to dimension accuracy of a bearing material after sintering as much as possible, but is not limited to these conditions.

Figure 5:
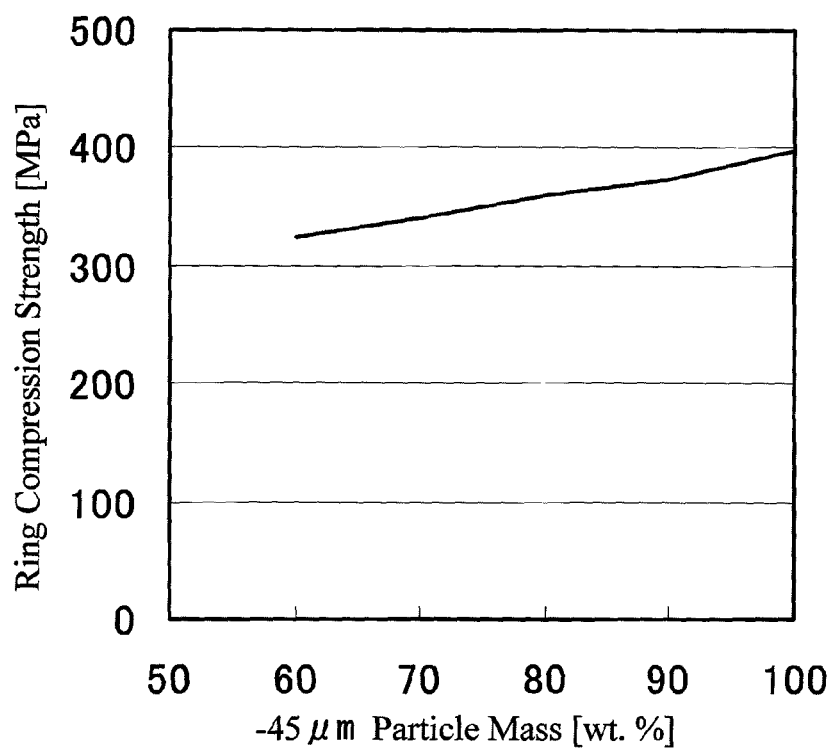
FIG. 5 is a graph showing relationship between particle mass with not more than 45 μm diameters in metal powder and ring compression strength of a bearing material after sintering.

In this case, the experimental result of the relationship between the particle mass with not more than 45 μm of diameters in the metal powder and ring compression strength of a bearing material after sintering is shown in FIG. 5. It becomes clear in this case that when the particle diameters are smaller, sintering performance is increased and ring compression strength of a sintered compact is increased.

Furthermore, as a powdersintered metal material is porous, since it is subject to pressure drop by leaking dynamic pressure in the case that it is used as a fluid dynamic pressure bearing, relative density is increased to not less than 80%, preferably to not less than 85% by performing recompression (sizing) in order to decrease pore mass or pore diameters inside the sintered compact and on a surface thereof. Due to recompression, remedying dimensional accuracy, improving roughness of a material surface and controlling surface pores can be achieved at the same time.

Dynamic pressure generating grooves are processed and formed on the bearing material made of the powdersintered metal produced as mentioned above. A processing means such as cutting or rolling is used in formation of the dynamic pressure generating grooves.

Furthermore, in order to seal pores on a porous surface in the bearing material after forming the dynamic pressure generating grooves, a ferrosoferric oxide ($Fe_3O_4$) membrane is formed. In formation of the ferrosoferric oxide, the steam treatment is carried out. For the conditions of the steam treatment in this case, what is described in the prior patent document No. 2 (JP 2007-57068 A) or the like can be applicable.

Even if a ferrosoferric oxide membrane is formed by only performing the steam treatment to a surface of a prior general sintered metal material, it is difficult to seal pores on the surface of the powdersintered metal material sufficiently and some open pores remain. Therefore, a disadvantage can easily arise such that it is difficult to control oil quantity injected into a gap between a motor shaft and an inner peripheral surface of a bearing at a regular quantity because the oil sucks into the porous material in addition that dynamic pressure worked on the inner peripheral surface of the bearing is leaked or the like.

However, like the present invention, in the case of using metal powder including at least not less than 70% (by weight), further preferably not less than 80% (by weight) of particle mass with diameters of not more than 45 μm, because gaps between metal particles of powdersintered metal material after powder compacting forming and sintering are uniform and extremely small, when about 5 μm of a ferrosoferric oxide ($Fe_3O_4$) membrane is formed on the porous surface by performing the steam treatment, an effect of sealing pores increases extremely, so that oil sucking into the sintered material and leakage of dynamic pressure at rotation of the motor shaft are prevented, and further formation of the dynamic pressure generating grooves become easy and dimensional accuracy of the grooves is increased remarkably.

In fact, a conceptual diagram (enlarged) of a part of an inner peripheral surface of a bearing after steam treatment is shown in FIGS. 1A & 1B. FIG. 1A shows a bearing due to the present invention, and FIG. 1B shows a bearing in the prior art. In this case, though many pores 3 are present in a metal part 1, air gaps between metal powder are large in the conventional bearing (shown in FIG. 1B), so that diameters of the pores 3 inside a sintered material and a surface of the sintered material become large.

As a result, because there are large variations in sizes of the pores 3 and open pores 2 exposed on the surface which is not sealed enough, even if a ferrosoferric oxide membrane 4 formed on the inner peripheral surface by the steam treatment is provided, the open pores 2 can communicate with the pores 3 inside the bearing. To the contrary, in the bearing (shown in FIG. 1A) according to the present invention, because air gaps between the metal powder are small, all pores 3 are small, and open pores exposed on the inner peripheral surface of the bearing can be sealed easily by a ferrosoferric oxide membrane 4 formed by the steam treatment, so that communication with pores 3 inside the bearing can be prevented by sealing pores perfectly.

Partial enlarged pictures of metal cross-section of the metal material after sintering are shown in FIGS. 2A & 2B in which, FIG. 2A shows a bearing material of the present invention and FIG. 2B shows a bearing material in the prior art. Thus, it can be seen that the bearing (shown in FIG. 2A) of the present invention has small and minute particles and even pores.

Figure 6:
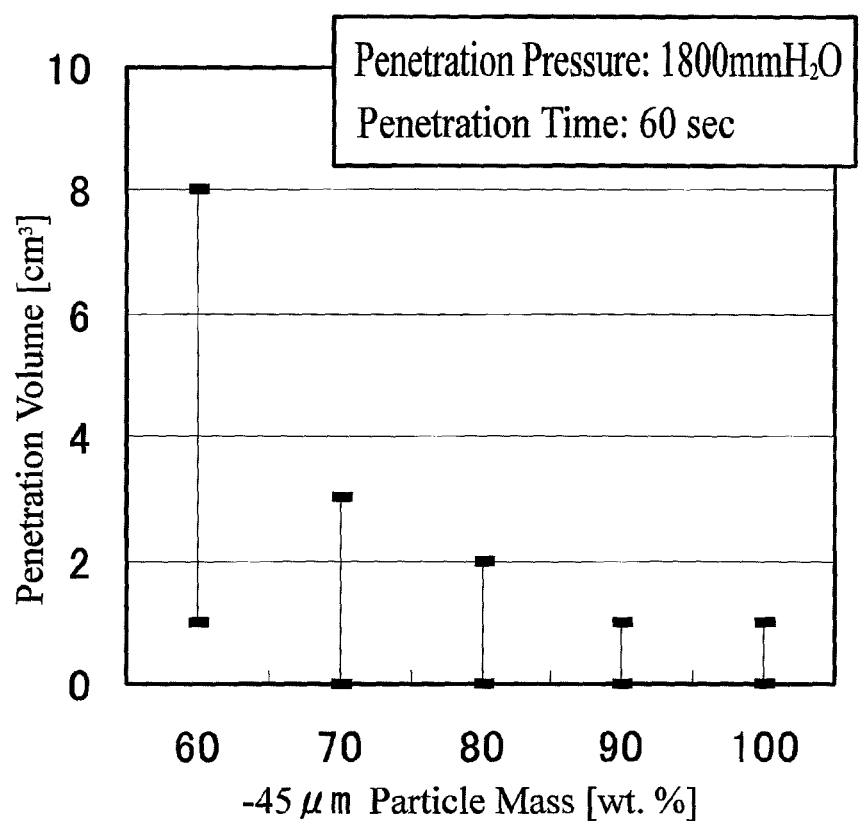
FIG. 6 is a graph showing relationship between particle mass with not more than 45 μm diameters in metal powder and air permeability of a bearing after steam treatment.

Experimental results for effectiveness of the steam treatment in the case of using metal powder including at least not less than 70% (by weight), further preferably 80% (by weight) of particles with diameters of not more than 45 μm is shown in FIG. 6. As is clear from FIG. 6, when the particle diameters of the metal powder are smaller, sealing pores in the surface of the bearing material by the steam treatment is facilitated, and thus it has been backed up that air permeability is decreased by preventing communication with the pores inside the bearing.

As described above, because metal powder including at least not less than 70% (by weight), further preferably not less than 80% (by weight) of particles with diameters of not more than 45 μm in the present invention, an effect of sealing pores by formation of a ferrosoferric oxide ($Fe_3O_4$) membrane onto the inner peripheral surface and the end surfaces can be increased sufficiently, and dimensional accuracy and a dynamic pressure effect can be further increased, increase of sintering strength can be achieved, and so it is possible to increase durability and rotation accuracy of the motor and to decrease noise.

Embodiment

Metal Powder

The metal powder is pure iron powder including not less than 98% of an iron component and having diameters of not more than 150 μm, plural kinds of metal powder which include 60% (by weight), 70% (by weight), 80% (by weight), 90% (by weight), 100% (by weight) of particles with diameters of not more than 45 μm respectively are prepared, and further 0.75% (by weight) of zinc stearate is mixed thereto.

[Powder Compacting Forming]

The powder compacting forming is performed at a welding pressure from 250 MPa to 350 MPa and arranged availably so as to obtain powder compacting density that the relative density is not less than 80%.

[Sintering]

The sintering is performed by using a mesh-belt type furnace in an air stream mixed with hydrogen and nitrogen in an atmosphere temperature of 1000° C. during 20 minutes.

[Sizing]

A bearing material after the sintering is recompressed until the relative density becomes not less than 85% in a mold.

[Groove Processing]

In the bearing material after sizing, grooves for generating dynamic pressure are formed on a surface portion of an inner surface thereof where a motor shaft is slid and contacted.

[Steam Treatment]

In the bearing material after processing grooves, steam treatment is performed at a temperature between 400 to 600° C. during 25 to 80 minutes.

[Finding Result]

In the bearing produced due to the above processes, when the particle mass with diameters of not more than 45 μm in the metal powder is 60% (by weight), an effect of sealing pores due to formation of a ferrosoferric oxide ($Fe_3O_4$) membrane is insufficient and penetration volume is up to 8 $cm^3$ and more. However, when the particle mass exceeds 70% (by weight), surface pores becomes even and fine, so that the effect of sealing pores due to formation of the ferrosoferric oxide ($Fe_3O_4$) membrane become high and penetration volume is remarkably decreased to not more than 3 $cm^3$.

For surface roughness of the material, when the particle mass with diameters of not more than 45 μm exceeds 70% (by weight), it is increased remarkably as compared with the case of 60% (by weight), so that it is found that it facilitates formation of the grooves for generating dynamic pressure and also dimensional accuracy. Moreover, as shown in FIG. 5, as the particle mass with diameters of not more than 45 μm is increased more, the ring compression strength (kgf/$mm^2$) of the bearing material is increased more, so that it is found that reliability at assembling the bearing can be also increased.

As mentioned above, according to the present invention, an effect of sealing pores is increased sufficiently by formation of a ferrosoferric oxide ($Fe_3O_4$) membrane on an inner peripheral surface and both end surfaces of a fluid dynamic pressure bearing which is made of sintered metal and having grooves for generating dynamic pressure on the inner peripheral surface. Dimensional accuracy and an effect of dynamic pressure are increased more together with increasing sintered strength, so that an extremely good fluid dynamic pressure bearing can be gained in a point that it is possible to increase durability and rotation accuracy of a motor and to achieve low noise.

What is claimed is:

1. A method of producing a fluid dynamic pressure bearing made of powder sintered metal having grooves for generating dynamic pressure on an inner peripheral surface of the bearing, said method comprising:
    compacting metal powder including not less than 70% by weight of particles with diameters of not more than 45 μm so as to form a bearing material, the cumulative 50% diameters (D50) of the particles of the metal powder being within a range of 20 μm to 60 μm as measured by a laser beam diffraction system particle size analyzer;
    sintering the bearing material;
    forming grooves on the sintered bearing material for generating dynamic pressure; and
    performing steam treatment on the sintered bearing material having the grooves so as to form a ferrosoferric oxide ($Fe_3O_4$) membrane on a porous surface of an inner surface of the bearing material.

2. The method of producing a fluid dynamic pressure bearing according to claim 1, wherein the metal powder for said compacting includes not less than 80% by weight of particles with diameters of not more than 45 μm.

3. The method of producing a fluid dynamic pressure bearing according to claim 2, wherein a particle size of the metal powder is controlled by a granulation process before said compacting.

4. The method of producing a fluid dynamic pressure bearing according to claim 3, wherein the metal powder for said compacting is iron powder including 98% by weight of an iron component or stainless steel powder.

5. The method of producing a fluid dynamic pressure bearing according to claim 4, further comprising performing a recompressing process on the sintered bearing material after said sintering, and then forming the grooves for generating dynamic pressure.

6. The method of producing a fluid dynamic pressure bearing according to claim 3, further comprising performing a recompressing process on the sintered bearing material after said sintering, and then forming the grooves for generating dynamic pressure.

7. The method of producing a fluid dynamic pressure bearing according to claim 2, wherein the metal powder for said compacting is iron powder including 98% by weight of an iron component or stainless steel powder.

8. The method of producing a fluid dynamic pressure bearing according to claim 7, further comprising performing a recompressing process on the sintered bearing material after said sintering, and then forming the grooves for generating dynamic pressure.

9. The method of producing a fluid dynamic pressure bearing according to claim 2, further comprising performing a recompressing process on the sintered bearing material after said sintering, and then forming the grooves for generating dynamic pressure.

10. The method of producing a fluid dynamic pressure bearing according to claim 1, wherein a particle size of the metal powder is controlled by a granulation process before said compacting.

11. The method of producing a fluid dynamic pressure bearing according to claim 10, wherein the metal powder for said compacting is iron powder including 98% by weight of an iron component or stainless steel powder.

12. The method of producing a fluid dynamic pressure bearing according to claim 11, further comprising performing a recompressing process on the sintered bearing material after said sintering, and then forming the grooves for generating dynamic pressure.

13. The method of producing a fluid dynamic pressure bearing according to claim 10, further comprising performing a recompressing process on the sintered bearing material after said sintering, and then forming the grooves for generating dynamic pressure.

14. The method of producing a fluid dynamic pressure bearing according to claim 1, wherein the metal powder for said compacting is iron powder including 98% by weight of an iron component or stainless steel powder.

15. The method of producing a fluid dynamic pressure bearing according to claim 14, further comprising performing a recompressing process on the sintered bearing material after said sintering, and then forming the grooves for generating dynamic pressure.

16. The method of producing a fluid dynamic pressure bearing according to claim 1, further comprising performing a recompressing process on the sintered bearing material after said sintering, and then forming the grooves for generating dynamic pressure.

17. The method of producing a fluid dynamic pressure bearing according to claim 1, wherein said performing of said steam treatment on the sintered bearing material having the grooves is performed to form a ferrosoferric oxide ($Fe_3O_4$) membrane on porous surfaces of an inner surface and both end surfaces of the bearing material.

* * * * *